US 010505759B2

(12) United States Patent
Meng

(10) Patent No.: US 10,505,759 B2
(45) Date of Patent: Dec. 10, 2019

(54) ACCESS LAYER-2 VIRTUAL PRIVATE NETWORK FROM LAYER-3 VIRTUAL PRIVATE NETWORK

(71) Applicant: HEWLETT PACKARD ENTERPRISE DEVELOPMENT LP, Houston, TX (US)

(72) Inventor: Dan Meng, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 177 days.

(21) Appl. No.: 15/546,005

(22) PCT Filed: Jan. 29, 2016

(86) PCT No.: PCT/CN2016/072695
§ 371 (c)(1),
(2) Date: Jul. 24, 2017

(87) PCT Pub. No.: WO2016/119734
PCT Pub. Date: Aug. 4, 2016

(65) Prior Publication Data
US 2018/0006842 A1    Jan. 4, 2018

(30) Foreign Application Priority Data

Jan. 29, 2015    (CN) .......................... 2015 1 0046228

(51) Int. Cl.
*H04L 29/06*    (2006.01)
*H04L 12/46*    (2006.01)
(Continued)

(52) U.S. Cl.
CPC ...... *H04L 12/4633* (2013.01); *H04L 12/4641* (2013.01); *H04L 43/50* (2013.01);
(Continued)

(58) Field of Classification Search
CPC ..... H04L 45/50; H04L 45/68; H04L 12/4633; H04L 12/4641
See application file for complete search history.

(56) References Cited

U.S. PATENT DOCUMENTS

2007/0091804 A1* 4/2007 Pan ........................ H04L 45/00
370/230
2009/0037607 A1* 2/2009 Farinacci ............ H04L 12/4641
709/249

(Continued)

FOREIGN PATENT DOCUMENTS

CN    101110745 A    1/2008
CN    101132374 A    2/2008
(Continued)

OTHER PUBLICATIONS

International Search Report and Written Opinion, International Application No. PCT/CN2016/072695, dated Apr. 28, 2016, pp. 1-6, SIPO.

(Continued)

*Primary Examiner* — Thaddeus J Plecha
(74) *Attorney, Agent, or Firm* — Hewlett Packard Enterprise Patent Department

(57) ABSTRACT

In an example, a network device may receive a L3VPN packet of which an egress label edge router (LER) is the network device, and acquire an adjacency index of an adjacency entry in an adjacency table according to the destination IP address of the inner IP datagram from the L3VPN packet. The network device may acquire a PW extended index of a PW extended entry in a PW extended table and a private network layer-2 header for the inner IP datagram from an adjacency entry having the adjacency index. By using the private network layer-2 header and a public network label, a private network label and a public network layer-2 header in a PW extended entry having the (Continued)

PW extended index, the network device may encapsulate the inner IP datagram into a L2VPN packet and forward the L2VPN packet through a physical egress interface in the PW extended entry.

15 Claims, 3 Drawing Sheets

(51) Int. Cl.
    *H04L 12/701*    (2013.01)
    *H04L 12/721*    (2013.01)
    *H04L 12/26*    (2006.01)
    *H04L 12/723*    (2013.01)

(52) U.S. Cl.
    CPC .............. *H04L 45/00* (2013.01); *H04L 45/66* (2013.01); *H04L 45/68* (2013.01); *H04L 45/50* (2013.01)

(56) References Cited

U.S. PATENT DOCUMENTS

2012/0327811 A1* 12/2012 Nozaki ................. H04L 12/462
    370/255
2013/0148657 A1* 6/2013 Salam ..................... H04L 45/66
    370/390

FOREIGN PATENT DOCUMENTS

| CN | 101667969 A | 3/2010 | |
|---|---|---|---|
| CN | 101848161 A | 9/2010 | |
| CN | 102291317 A | 12/2011 | |
| EP | 1780960 A2 | 5/2007 | |
| WO | WO-2009012688 A1 * | 1/2009 | ......... H04L 12/4641 |
| WO | WO-2011035703 A1 * | 3/2011 | ........... H04L 12/462 |

OTHER PUBLICATIONS

Li et al, Abstract on Research and Realization of VPLS-Based L2VNPN Technology, May 15, 2011, 72 pages.

* cited by examiner

ACCESS LAYER-2 VIRTUAL PRIVATE NETWORK FROM LAYER-3 VIRTUAL PRIVATE NETWORK

BACKGROUND

In recent years, technologies relating to IP-based mobile networks have been used in the telecommunications network. As an example, IP-based Radio Access Network (RAN) (abbreviated as IP RAN) has been introduced, IP RAN is a resolution which combines Layer-2 and Layer-3 Virtual Private Network (VPN) technologies based on Multi-Protocol Label Switching (MPLS) protocol. Layer-2 Virtual Private Network (L2VPN) and Layer-3 Virtual Private Network (L3VPN) respectively provide a private network service among a set of customer sites using a service provider's existing MPLS and IP network. In a Layer-2 VPN, the Layer-3 routing of customer traffic occurs within the customer's network. In a Layer-3 VPN, the Layer-3 routing of customer traffic occurs within the service provider's network. The IP RAN technology satisfies requirements for backhaul communication from base stations. In IP RAN networking, layer-2 access networks may be isolated from one another by L2VPN. And access network routing and core network routing may be isolated by L3VPN. A network device, which is located at the intersection between an access network and a core network, may connect a layer-2 access network and a layer-3 core network by mutual accessing between L2VPN and L3VPN. In the downlink direction from L3VPN to L2VPN, the rate on the network device for forwarding packets from L3VPN to L2VPN may influence the performance of IP RAN.

DETAILED DESCRIPTION OF THE EMBODIMENTS

Figure 1:
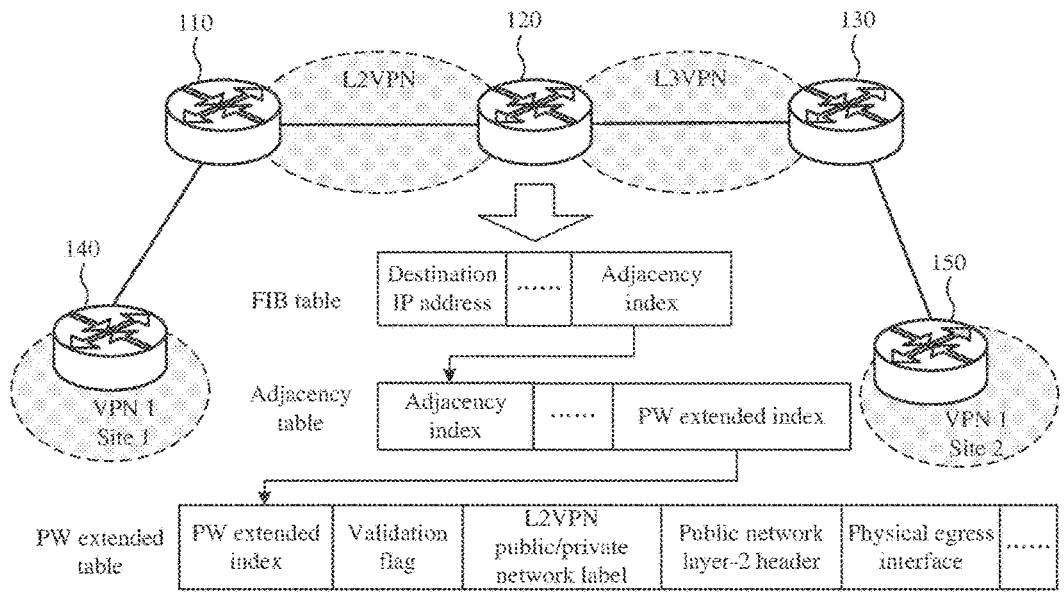
FIG. 1 schematically illustrates a networking structure in which L2VPN and L3VPN are bridged with a network device according to an example of the present disclosure.

FIG. 1 illustrates a networking structure in which MPLS L2VPN and L3VPN are bridged with a network device. Provider Edge (PE) 110 is an edge device in L2VPN and connected with Custom Edge (CE) 140 at Site 1 in VPN 1. PE 130 is an edge device in L3VPN and connected with CE 150 at Site 2 in VPN 1. A network device 120 is an edge device belonging to both L2VPN and L3VPN. For IP RAN, CE 140 may be a base station or a CE device for an enterprise user, etc. PE 110 may be an access device in an access network. PE 130 may be a core routing device in a core network. CE 150 may be a Base Station Controller (BSC), an Evolved Packet Core (EPC) device, etc.

A packet communicated between Site 1 and Site 2 in VPN 1 may be encapsulated into a L3VPN packet to be transmitted between PE 130 and the network device 120, and encapsulated into a L2VPN packet to be transmitted between the network device 120 and PE 110. For a packet transmitted from Site 1 to Site 2 in VPN 1, the network device 120 may perform a function of accessing L3VPN from L2VPN. For a packet transmitted from Site 2 to Site 1 in VPN 1, the network device 120 may perform a function of accessing L2VPN from L3VPN.

The network device 120 may be provided with a Layer-3 Virtual Entity (L3VE) interface and a Layer-2 Virtual Entity (L2VE) interface, wherein the L3VE interface corresponds to L3VPN and may transmit and receive a L3VPN packet, and the L2VE interface corresponds to L2VPN and may transmit and receive a L2VPN packet. The network device 120 may perform the following process for a packet to be forwarded from L3VPN to L2VPN.

When receiving a L3VPN packet, the network device 120 may remove the layer-2 header of the L3VPN packet and query an Incoming Label Map (ILM) table to determine an entry matching the MPLS label of the L3VPN packet. When the network device 120 is determined as the egress Label Edge Router (LER) of the L3VPN packet, the network device 120 may remove the MPLS label to acquire an inner IP datagram.

The network device 120 may set a L3VE interface as an ingress interface and count packets received through the L3VE interface to obtain the number of packets received from the L3VE interface. The counting result may be displayed to facilitate monitoring the network state. The display mode of the counting result is not limited. For example, the counting result may be displayed via a user interface or in any other form.

The network device 120 may query a private network Forwarding Information Base (FIB) table to acquire an egress interface and an adjacency index according to the destination IP address of the inner IP datagram.

The network device 120 may set a L2VE interface as the egress interface.

The network device 120 may query an adjacency table to acquire a private network layer-2 header from an adjacency entry having the adjacency index acquired from the private network FIB table. Wherein, the private network layer-2 header may indicate a Media Access Control (MAC) address corresponding to the next-hop address in private network. For a packet to be forwarded to L2VPN, the next-hop address in private network may indicate a next-hop address of an inner IP datagram in the packet. Then the network device 120 may use the acquired private network layer-2 header to encapsulate the inner IP datagram and thus obtain an inner IP datagram to be forwarded to L2VPN.

The network device 120 may count packets received through the L2VE interface to obtain the number of packets received from the L2VE interface.

The network device 120 may query a L2VE interface table and a L2VPN public network tunnel table to acquire a public network label such as a tunnel label, a private network label such as a virtual circuit (VC) label, a physical egress interface and an adjacency index, which are corresponding to the L2VE interface.

The network device 120 may query the adjacency table to acquire a MAC address corresponding to the next-hop address in public network from an adjacency entry having the adjacency index acquired from the L2VE interface table.

The next-hop address in public network may indicate a next-hop address of a L2VPN packet to be forwarded to L2VPN.

The network device 120 may encapsulate the inner IP datagram into a L2VPN packet by using the public network label, the private network label and a public network layer-2 header, and then transmit the L2VPN packet through the physical egress interface.

It can be seen from above that, for a packet to be forwarded from L3VPN to L2VPN, it may experience two separate Virtual Private Network (VPN) processes on the network device 120. One VPN process is for terminating L3VPN, and the other VPN process is for accessing L2VPN. Thus, the rate for forwarding packets from L3VPN to L2VPN may be decreased. For example, when L2VPN and L3VPN have a throughput of 10 million packets per second (Mpps) respectively, the rate for forwarding packets from L3VPN to L2VPN can reach 5 Mpps at most and may be difficult to satisfy the requirement for performance of IP RAN network in comparison with cases for transmitting packets on L3VPN or on L2VPN.

According to an example implementing techniques described herein, a L2VE interface table may record a private network label and a L2VPN public network index. When a L2VE interface index is acquired by querying the private network FIB table, the L2VE interface index may be used to query the L2VE interface table so as to acquire corresponding private network label and L2VPN public network index.

A L2VPN public network tunnel table may record a public network label, a physical egress interface and an adjacency index. When the L2VPN public network tunnel index is acquired by querying the L2VE interface table, the L2VPN public network tunnel index may be used to query the L2VPN public network tunnel table so as to acquire corresponding public network label, physical egress interface and adjacency index.

An adjacency table may record a public network layer-2 header including a MAC address corresponding to the next-hop address in public network. When the adjacency index is acquired by querying the L2VPN public network tunnel table, the adjacency index may be used to query the adjacency table so as to acquire corresponding public network layer-2 header.

Figure 2:
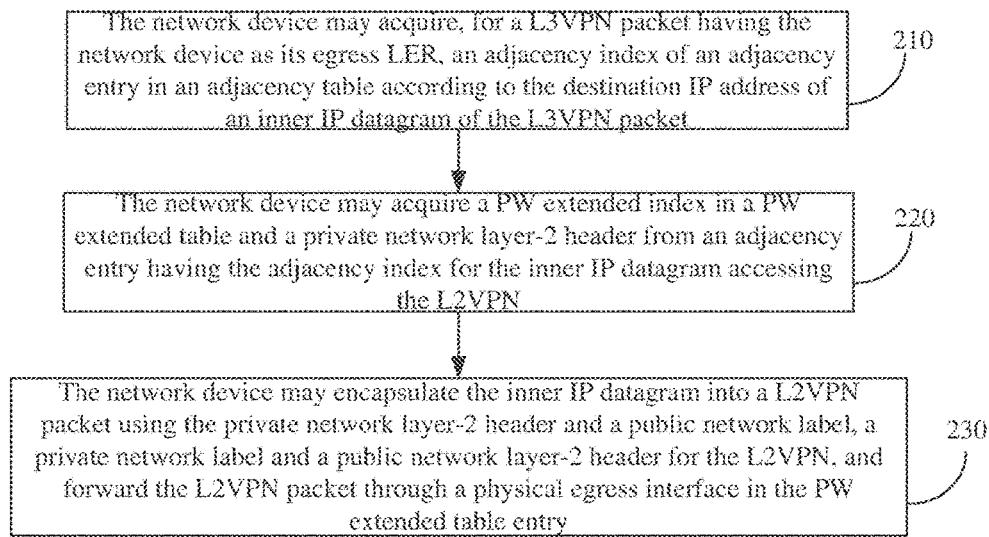
FIG. 2 is a flowchart illustrating a method for accessing L2VPN from L3VPN according to an example of the present disclosure.

According to an example, a method for accessing L2VPN from L3VPN may shorten the process for forwarding a packet from L3VPN to L2VPN and thus improve the processing performance. The method may be applied on a network device. The process flow of the method may be as illustrated in FIG. 2.

At block 210, for a L3VPN packet having the network device as its egress LER, the network device may acquire an adjacency index of an adjacency entry in an adjacency table according to the destination IP address of an inner IP datagram of the L3VPN packet. An adjacency entry in the adjacency table may include a Pseudo wires (PW) extended index corresponding to a L2VPN to be accessed.

According to an example, when receiving a L3VPN packet, the network device may query an ILM table according to the MPLS label of the L3VPN packet. When the network device is determined as the egress LER of the L3VPN packet, the network device may extract an inner IP datagram of the L3VPN packet. The network device may query a private network FIB table according to the destination IP address of the inner IP datagram and thus acquire the next-hop address, the egress interface and the adjacency index of the inner IP datagram from an entry in the FIB table.

For an inner IP datagram accessing a L2VPN, the egress interface of the inner IP datagram may be a L2VE interface corresponding to the L2VPN. In the adjacency table, the adjacency entry corresponding to the adjacency index of the inner IP datagram may include a PW extended index corresponding to the L2VPN.

In the present example, a PW extended table may be maintained on the network device to record encapsulating and forwarding information with respect to a L2VPN to be accessed from the network device. Each of the entries in the PW extended table may be provided with a PW extended index and record information including a public network label, a private network label, a public network layer-2 header, a physical egress interface and so on for the L2VPN (corresponding to the L2VE interface).

The expression "PW extended table" is only a name by way of example but not limited, and information in the PW extended table may be recorded in any other form and be referred to as any other name.

In an example, the PW extended table may be configured on the network device manually. In another example, the PW extended table may be generated by a software module running on the network device querying the L2VE interface table, the L2VPN public network tunnel table and the adjacency table to acquire encapsulating and forwarding information with respect to each of the L2VPNs to be accessed from the network device.

A PW extended index may be added into an adjacency entry in the adjacency table which corresponds to an adjacency index recorded in the FIB table for accessing L2VPN. For example, the adjacency entry may include a private network layer-2 header for accessing L2VPN and a PW extended index, the PW extended index may indicate a PW extended entry in the PW extended table which corresponds to a L2VPN to be accessed, and the PW extended entry may include a public network label, a private network label, a public network layer-2 header, a physical egress interface and so on of the L2VPN. The relationship between the adjacency index and the PW extended index may be as illustrated in FIG. 1.

According to an example, the adjacency table may include multiple adjacency entries with respective adjacency indexes, and each of the adjacency entries may be acquired by querying the adjacency table with corresponding adjacency index. The PW extended table may include multiple PW extended entries with respective PW extended indexes, and each of the PW extended entries may be acquired by querying the PW extended table with corresponding PW extended index.

At block 220, for the inner IP datagram accessing a L2VPN, the network device may acquire a PW extended index of a PW extended entry in a PW extended table and a private network layer-2 header from the adjacency entry having the adjacency index for the L2VPN to be accessed.

As described above, the adjacency entry may include a PW extended index for the L2VPN to be accessed. For the inner IP datagram which is to be forwarded to the L2VPN from the L3VPN, the network device may acquire an adjacency index from the FIB table, and acquire a private network layer-2 header and a PW extended index for the L2VPN to be accessed from the adjacency entry having the adjacency index.

At block 230, by using the private network layer-2 header, and a public network label, a private network label and a public network layer-2 header for the L2VPN in a PW extended entry having the PW extended index, the network device may encapsulate the inner IP datagram into a L2VPN packet, and forward the L2VPN packet through a physical egress interface in the PW extended entry.

The network device may query the PW extended table, so as to acquire the public network label, the private network label, the public network layer-2 header and the physical egress interface for the L2VPN from the PW extended entry having the PW extended index. By using the public network label, the private network label and the public network layer-2 header in the PW extended entry and the private network layer-2 header in the adjacency entry, the network device may encapsulate the inner IP datagram into a L2VPN packet, and forward the encapsulated L2VPN packet through the physical egress interface in the PW extended entry.

In some examples, changes of L2VPN configuration on the network device such as changing the physical egress interface to a L2VPN and changes of physical transmission link of L2VPN such as changing the next-hop address in public network for a L2VPN may cause the PW extended entry to be invalid. Therefore, a validation flag indicating whether a PW extended entry in the PW extended table is valid or not may be added into the PW extended entry. At block 230, the network device may query the PW extended table so as to acquire the validation flag from the PW extended entry having the PW extended index. When the validation flag indicates the PW extended entry is valid, the network device may encapsulate the inner IP datagram into a L2VPN packet by using the public network label, the private network label and the public network layer-2 header for the L2VPN in the PW extended entry and forward the L2VPN packet through the physical egress interface in the PW extended entry. When the validation flag indicates the PW extended entry is invalid, the network device may encapsulate the inner IP datagram into a L2VPN packet and forward the encapsulated L2VPN packet by querying the L2VE interface table, the L2VPN public network tunnel table and the adjacency table.

When an event which may cause content changing of a PW extended entry occurs on the network device, the validation flag of the PW extended entry may be set as invalid. And then, after the PW extended entry is updated according to the occurred event, the validation flag in the PW extended entry may be re-set as valid. The above process for maintaining the PW extended table may be automatically performed by a software module running on the network device. According to an example, when configuration of a L2VPN on the network device is changed, or a signaling protocol such as Label Distribution Protocol (LDP) or Border Gateway Protocol (BGP)) running for a L2VPN causes a link change, the validation flag of the PW extended entry for the L2VPN to which changes occur may be set as invalid. After configuration of the L2VPN is completed or the signaling protocol is converged, the L2VE interface table, the public network tunnel table and the adjacency table may be automatically updated according to the new configuration or the converging result of the signaling protocol. And then, an updated encapsulating and forwarding information of the L2VPN may be acquired by querying these tables and used to update the PW extended entry for the L2VPN in the PW extended table. And the validation flag of the updated PW extended entry may be set as valid.

In an example, a counting address field for the L2VE interface may be added into the PW extended entry in the PW extended table so as to count packets through a L2VE interface on the network device for obtaining the number of packets passing through the L2VE interface. The counting address field may indicate a storage address for storing the counting result. For example, when the PW extended entry is acquired according to the PW extended index recorded in the adjacency table, the counting address field for the L2VE interface in the PW extended entry may be utilized to count packets through the L2VPN, and the counting result may be stored into a storage location corresponding to the address indicated by the counting address field.

In this example, encapsulating and forwarding information for a L2VPN may be recorded into a PW extended entry in a PW extended table, and a PW extended index may be added into an adjacency entry in an adjacency table. For a packet which is to be forwarded to the L2VPN from the L3VPN, all information required for obtaining a L2VPN-encapsulated packet and forwarding the L2VPN-encapsulated packet may be acquired by querying the adjacency table and the PW extended table, which can shorten the process flow and improve the processing performance of the network device.

The described methods for accessing L2VPN from L3VPN may be not only applicable to a network device of which a processor such as a Central Process Unit (CPU) performs packet forwarding from L3VPN to L2VPN, but also applicable to a programmable pipeline network device such as Field Programmable Gate Array (FPGA) and a Network Processor (NP).

In another example, a network device may be provided with a L3VE interface corresponding to L3VPN and a L2VE interface corresponding to L2VPN. A PW extended table may be generated by extracting content from the L2VE interface table, the L2VPN public network tunnel table and the adjacency table on the network device. Each of the PW extended entries in the PW extended table may include a public network label, a private network label, a public network layer-2 header and a physical egress interface for a L2VPN, a counting address field for the L2VE interface corresponding to the L2VPN and a validation flag. The validation flag may indicate whether the PW extended entry is valid or not. There is a PW extended index of the PW extended entry corresponding to the L2VPN to be accessed from the network device in the adjacency entry for the L2VPN.

Figure 3:
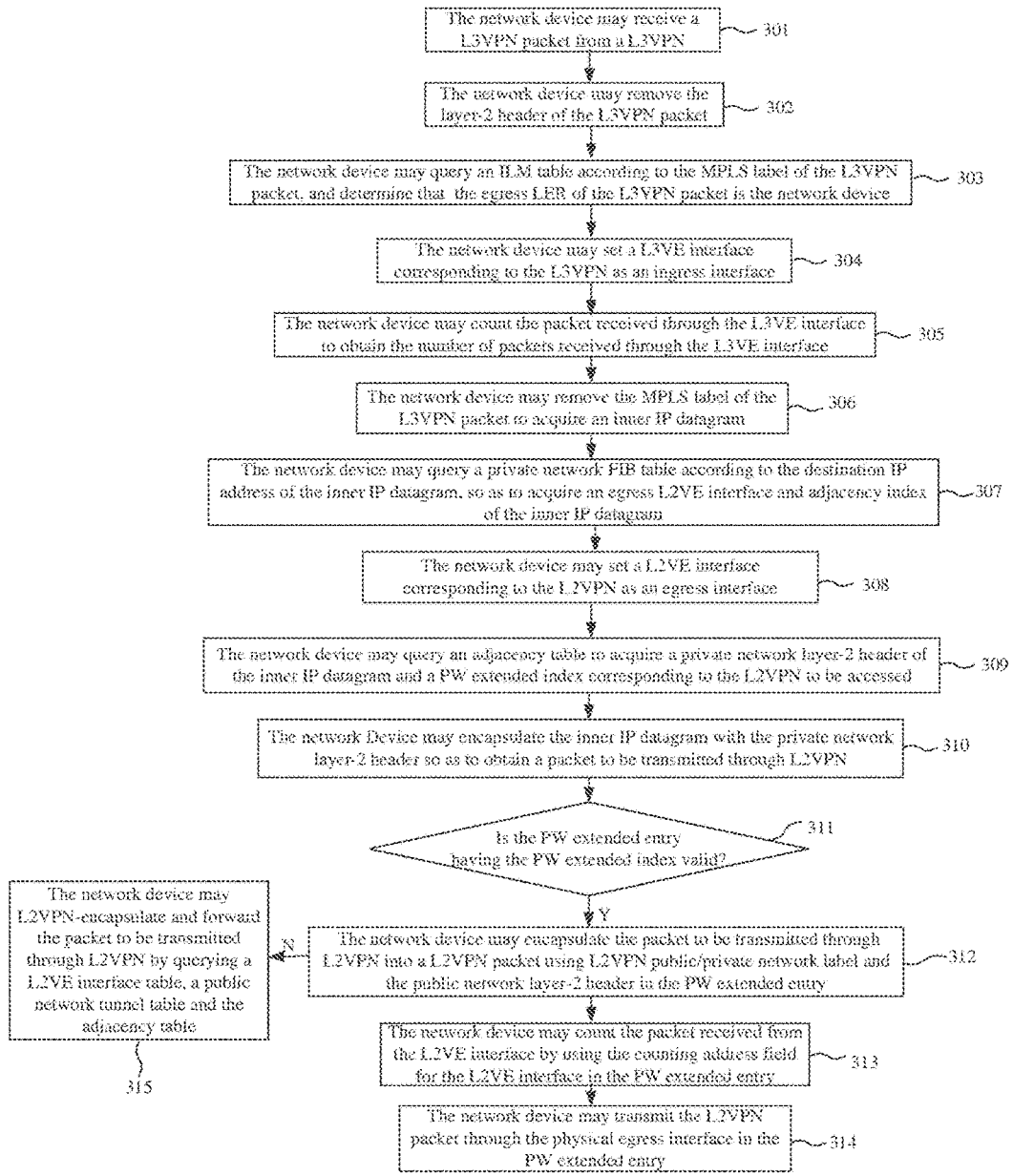
FIG. 3 is a flowchart illustrating process for a packet to be forwarded from L3VPN to L2VPN according to an example of the present disclosure.

For a packet to be forwarded from L3VPN to L2VPN, the process on the network device may be as illustrated in FIG. 3.

At block 301, the network device may receive a L3VPN packet from a L3VPN.

At block 302, the network device may remove the layer-2 header of the L3VPN packet.

At block 303, the network device may query an ILM table according to the MPLS label of the L3VPN packet, and determine that the egress LER of the L3VPN packet is the network device itself.

At block 304, the network device may set the L3VE interface corresponding to the L3VPN as the ingress interface.

At block 305, the network device may count the packet received through the L3VE interface to obtain the number of packets received through the L3VE interface.

At block 306, the network device may remove the MPLS label of the L3VPN packet to acquire an inner IP datagram.

At block 307, the network device may query a private network FIB table according to the destination IP address of the inner IP datagram, so as to acquire an egress interface and an adjacency index of the inner IP datagram. Since the inner IP datagram will be forwarded through a L2VPN, the egress interface of the inner IP datagram is a L2VE interface corresponding to the L2VPN.

At block 308, the network device may set the L2VE interface corresponding to the L2VPN as the egress interface.

At block 309, the network device may query an adjacency table to acquire an adjacency entry having the adjacency index. Since the adjacency index is an adjacency index for the L2VPN to be accessed, the adjacency entry corresponding to the adjacency index may include a PW extended index. From the adjacency entry, the network device may acquire a private network layer-2 header of the inner IP datagram and a PW extended index corresponding to the L2VPN to be accessed.

At block 310, the network device may encapsulate the inner IP datagram with the private network layer-2 header so as to obtain a packet which is to be transmitted through the L2VPN.

At block 311, the network device may query a PW extended table to acquire a PW extended entry having the PW extended index, and determine whether the PW extended entry is valid or not according to the validation flag of the PW extended entry. And if the PW extended entry is valid, the network device may execute block 312; otherwise, the network device may execute block 315.

At block 312, the network device may encapsulate the packet which is to be transmitted through the L2VPN into a L2VPN packet by using a public network label, a private network label and a public network layer-2 header for the L2VPN in the PW extended entry.

At block 313, the network device may count the packet received through the L2VE interface by using the counting address field for the L2VE interface in the PW extended entry.

At block 314, the network device may transmit the L2VPN packet through a physical egress interface in the PW extended entry. Then the process ends.

At block 315, the network device may encapsulate the packet which is to be forwarded through L2VPN into a L2VPN packet and forward the L2VPN packet by querying the L2VE interface table, the public network tunnel table and the adjacency table.

Figure 4:
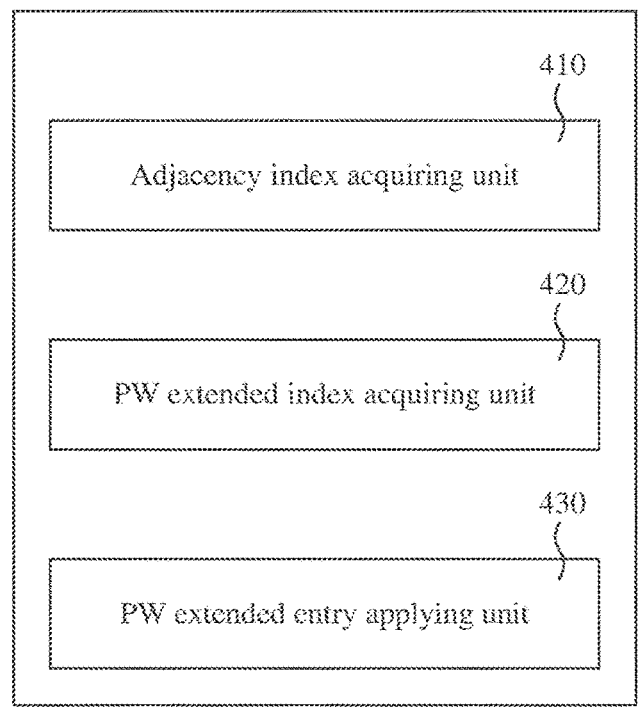
FIG. 4 is a diagram illustrating an apparatus which accesses L2VPN from L3VPN according to an example of the present disclosure.

In another example, an apparatus for accessing L2VPN from L3VPN which is included in a network device is provided. FIG. 4 is a schematic diagram of the apparatus. The apparatus may functionally include an adjacency index acquiring unit 410, a PW extended index acquiring unit 420 and a PW extended entry applying unit 430.

The adjacency index acquiring unit 410 may receive a L3VPN packet of which the egress LER is the network device, and acquire an adjacency index of an adjacency entry in an adjacency table according to the destination IP address of the inner IP datagram of the L3VPN packet. In an adjacency table, an adjacency entry corresponding to the adjacency index may include a PW extended index corresponding to a L2VPN.

The PW extended index acquiring unit 420 may acquire a PW extended index of a PW extended entry in a. PW extended table and a private network layer-2 header for the inner IP datagram from the adjacency entry having the adjacency index. The PW extended entry in the PW extended table may include a public network label, a private network label, a public network layer-2 header and a physical egress interface of the L2VPN to be accessed.

The PW extended entry applying unit 430 may encapsulate the inner IP datagram into a L2VPN packet by using the public network label, the private network label and the public network layer-2 header for the L2VPN in the PW extended entry having the PW extended index and the private network layer-2 header. Then the PW extended entry applying unit 430 may forward the L2VPN packet through the physical egress interface in the PW extended entry.

According to an example, a PW extended entry in the PW extended table may further include a validation flag for indicating whether the PW extended entry is valid or not. When the validation flag indicates the PW extended entry is valid, the PW extended entry applying unit 430 may encapsulate the inner IP datagram into a L2VPN packet by using the public network label, the private network label and the public network layer-2 header for the L2VPN in the PW extended entry and the private network layer-2 header. Then the PW extended entry applying unit 430 may forward the L2VPN packet through the physical egress interface in the PW extended entry.

In the above example, the apparatus may further include a PW extended entry validation flag setting unit. When an event which may cause content changing of a PW extended entry occurs, the PW extended entry validation flag setting unit may set the validation flag in the PW extended entry as invalid. And after the PW extended entry is updated according to the event, the PW extended entry validation flag setting unit may set the validation flag in the PW extended entry as valid.

The network device may include a L2VE interface corresponding to the L2VPN. The PW extended entry in the PW extended table may further include a counting address field for the L2VE interface. The apparatus may further include a L2VE interface counting unit to count packets through the L2VE interface by using the counting address field in the PW extended entry having the PW extended index and thus to obtain the number of packets passing through the L2VE interface.

The network device may include a L2VE interface corresponding to the L2VPN. The apparatus may further include a PW extended table generating unit to generate the PW extended table according to the L2VE interface table, the L2VPN public network tunnel table and the adjacency table.

Figure 5:
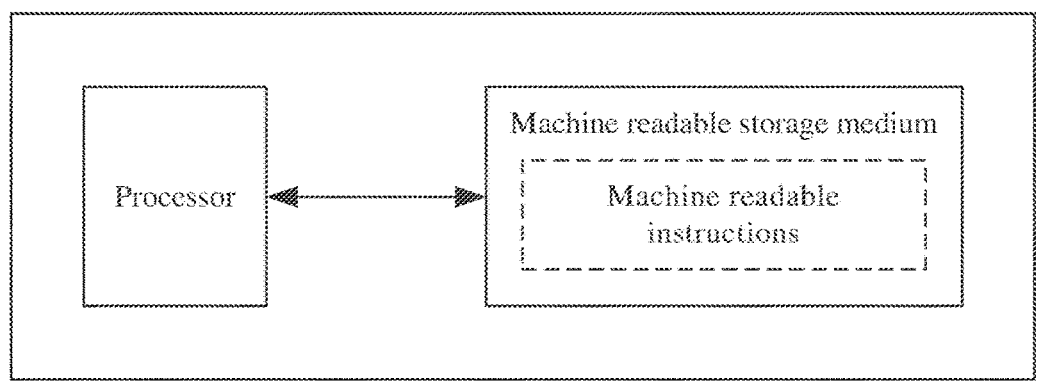
FIG. 5 schematically illustrates an apparatus which accesses L2VPN from L3VPN according to an example of the present disclosure.

The apparatus for accessing L2VPN from L3VPN may be a programmable device combining software with hardware, and the hardware architecture of the apparatus may be as illustrated in FIG. 5. FIG. 5 schematically illustrates an apparatus for a L2VPN from L3VPN. As illustrated in FIG. 5, the apparatus may comprise a machine readable storage medium and a processor.

The machine readable storage medium may store machine readable instructions which are executed by the processor to perform the function of accessing L2VPN from L3VPN.

The processor may communicate with the machine readable storage medium, and read and execute the instructions stored in the machine readable storage medium to perform the function of accessing L2VPN from L3VPN.

The machine readable storage medium may be any electronic, magnetic, optic or other type of physical storage device, and may contain or store information such as executable instructions and data. For example, the machine readable storage medium may be random access memory (RAM), volatile memory, non-volatile memory, flash memory, storage drive such as hard disk drive, solid state hard disk, other types of storage disk such as optic disk and DVD, or similar types of storage medium, or combinations thereof. Further, any type of machine readable storage medium described herein may be non-transitory.

The network device including an apparatus for accessing L2VPN from L3VPN may be realized by FPGA or NP, or may be a device having a structure of a processor such as CPU plus machine readable storage medium.

According to an example, the machine readable storage medium may store machine readable instructions which can be executed by the processor to perform the following operations. The processor may receive from a L3VPN a L3VPN packet of which an egress LER is the network device, and acquire an adjacency index according to the destination IP address of an inner IP datagram of the L3VPN packet. The adjacency entry having the adjacency index in the adjacency table may include a pseudo wire (PW) extended index corresponding to a L2VPN to be accessed. With respect to the inner IP datagram to be forwarded to the L2VPN, the processor may acquire a PW extended index and a private network layer-2 header from the adjacency entry having the adjacency index. Each of the PW extended entries in a PW extended table may include a public network label, a private network label, a public network layer-2 header and a physical egress interface for the L2VPN. The processor may encapsulate the inner IP datagram into a L2VPN packet by using the public network label, the private network label and the public network layer-2-header for the L2VPN in the PW extended entry having the PW extended index and the private network layer-2 header. Then the processor may transmit the L2VPN packet through the physical egress interface in the PW extended entry.

According to an example, the PW extended entry in the PW extended table may further include a validation flag indicating whether the PW extended entry is valid or not. By executing the machine readable instructions, the processor may further perform the following operations. When the PW extended entry having the PW extended index is valid, the processor may encapsulate the inner IP datagram into a L2VPN packet by using the private network layer-2 header and the public network label, the private network label and the public network layer-2 header for the L2VPN in the PW extended entry. Then the processor may forward the L2VPN packet through the physical egress interface in the PW extended entry.

According to an example, by executing the machine readable instructions, the processor may further perform the following operations. When an event occurs and causes content changing of a PW extended entry, the processor may set the validation flag in the PW extended entry as invalid. And after the PW extended entry is updated according to the event, the processor may set the validation flag in the PW extended entry as valid.

According to an example, the network device may include a L2VE interface corresponding to the L2VPN, the PW extended entry of the PW extended table may further include a counting address field for the L2VE interface. And by executing the machine readable instructions, the processor may further count packets through the L2VE interface by using the counting address field in the PW extended entry corresponding to the PW extended index.

According to an example, the network device may include a L2VE interface corresponding to the L2VPN. And by executing the machine readable instructions, the processor may further generate the PW extended table according to the L2VE interface table, the L2VPN public network tunnel table and the adjacency table.

The foregoing examples are merely illustrative but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for accessing a layer-2 virtual private network (L2VPN) from a layer-3 virtual private network (L3VPN), includes:
   receiving, by a network device, a L3VPN packet of which an egress label edge router (LER) is the network device;
   acquiring, by the network device, an adjacency index of an adjacency entry in an adjacency table according to a destination IP address of an inner IP datagram from the L3VPN packet,
      wherein, an adjacency entry in the adjacency table includes a pseudo wire (PW) extended index corresponding to a L2VPN to be accessed;
   acquiring, by the network device, a PW extended index of a PW extended entry in a PW extended table and a private network layer-2 header for the inner IP datagram from the adjacency entry having the adjacency index,
      wherein, the PW extended entry in the PW extended table includes a public network label, a private network label, a public network layer-2 header and a physical egress interface for a L2VPN to be accessed;
   encapsulating, by the network device, the inner IP datagram into a L2VPN packet by using the private network layer-2 header acquired from the adjacency entry having the adjacency index and the public network label, the private network label and the public network layer-2 header in the PW extended entry having the PW extended index; and
   transmitting, by the network device, the L2VPN packet through the physical egress interface in the PW extended entry having the PW extended index.

2. The method according to claim 1, wherein,
   the PW extended entry in the PW extended table further includes a validation flag indicating whether the PW extended entry is valid or not; and
   the method further includes:
      determining, by the network device, whether the PW extended entry having the PW extended index is valid or not according to the validation flag in the PW extended entry, and
      performing, by the network device, the encapsulation when the PW extended entry having the PW extended index is determined as valid.

3. The method according to claim 2, further includes:
   setting, by the network device, the validation flag in the PW extended entry as invalid when an event occurs and causes content changing of the PW extended entry; and
   setting, by the network device, the validation flag in the PW extended entry as valid after the PW extended entry is updated according to the event.

4. The method according to claim 1, wherein the network device includes a layer-2 virtual entity (L2VE) interface corresponding to the L2VPN, and the PW extended entry in the PW extended table further includes a counting address field for the L2VE interface, and
   the method further includes:
      counting, by the network device, packets received from the L2VE interface by using the counting address field for the L2VE interface in the PW extended entry having the PW extended index.

5. The method according to claim 1, wherein the network device includes a layer-2 virtual entity (L2VE) interface corresponding to the L2VPN, and the method further includes:
generating, by the network device, the PW extended table according to a L2VE interface table, a L2VPN public network tunnel table and the adjacency table.

6. An apparatus for accessing a layer-2 virtual private network (L2VPN) from a layer-3 virtual private network (L3VPN) on a network device, the apparatus comprising: a processor and a non-transitory storage medium storing machine readable instructions that are executable by the processor to:
receive a L3VPN packet of which an egress label edge router (LER) is the network device;
acquire an adjacency index of an adjacency entry in an adjacency table according to a destination IP address of an inner IP datagram from the L3VPN packet,
wherein an adjacency entry in the adjacency table includes a pseudo wire (PW) extended index corresponding to a L2VPN to be accessed;
acquire a PW extended index of a PW extended entry in a PW extended table and a private network layer-2 header for the inner IP datagram from the adjacency entry having the adjacency index,
wherein the PW extended entry in the PW extended table includes a public network label, a private network label, a public network layer-2 header and a physical egress interface for a L2VPN to be accessed;
encapsulate the inner IP datagram into a L2VPN packet by using the private network layer-2 header acquired from the adjacency entry having the adjacency index and the public network label, the private network label and the public network layer-2 header in the PW extended entry having the PW extended index; and
transmit the L2VPN packet through the physical egress interface in the PW extended entry having the PW extended index.

7. The apparatus according to claim 6, wherein,
the PW extended entry in the PW extended table further includes a validation flag indicating whether the PW extended entry is valid or not; and
the machine readable instructions are executed by the processor to:
determine whether the PW extended entry having the PW extended index is valid or not according to the validation flag in the PW extended entry, and perform the encapsulation when the PW extended entry having the PW extended index is determined as valid.

8. The apparatus according to claim 7, the machine readable instructions are executed by the processor to:
set the validation flag in the PW extended entry as invalid when an event occurs and causes content changing of the PW extended entry; and
set the validation flag in the PW extended entry as valid after the PW extended entry is updated according to the event.

9. The apparatus according to claim 6, wherein,
the network device includes a layer-2 virtual entity (L2VE) interface corresponding to the L2VPN, and the PW extended entry in the PW extended table further includes a counting address field for the L2VE interface, and
the machine readable instructions are executed by the processor to:
count packets received from the L2VE interface by using the counting address field for the L2VE interface in the PW extended entry having the PW extended index.

10. The apparatus according to claim 6, wherein the network device includes a layer-2 virtual entity (L2VE) interface corresponding to the L2VPN, and the machine readable instructions are executed by the processor to:
generate the PW extended table according to a L2VE interface table, a L2VPN public network tunnel table and the adjacency table.

11. A non-transitory storage medium storing machine readable instructions, wherein by executing the machine readable instructions with a processor of a network device, the processor is caused to:
receive a layer-3 virtual private network (L3VPN) packet of which an egress label edge router (LER) is the network device;
acquire an adjacency index of an adjacency entry in an adjacency table according to a destination IP address of an inner IP datagram from the L3VPN packet,
wherein, an adjacency entry in the adjacency table includes a pseudo-wire (PW) extended index corresponding to a layer-2 virtual private network (L2VPN) to be accessed;
acquire a PW extended index of a PW extended entry in a PW extended table and a private network layer-2 header for the inner IP datagram from the adjacency entry having the adjacency index,
wherein, the PW extended entry in the PW extended table includes a public network label, a private network label, a public network layer-2 header and a physical egress interface for a L2VPN to be accessed;
encapsulate the inner IP datagram into a L2VPN packet by using the private network layer-2 header acquired from the adjacency entry having the adjacency index and the public network label, the private network label and the public network layer-2 header in the PW extended entry having the PW extended index; and
transmit the L2VPN packet through the physical egress interface in the PW extended entry having the PW extended index.

12. The storage medium according to claim 11, wherein,
the PW extended entry in the PW extended table further includes a validation flag indicating whether the PW extended entry is valid or not; and
by executing the machine readable instructions, the processor is further caused to:
determine whether the PW extended entry having the PW extended index is valid or not according to the validation flag in the PW extended entry, and
perform the encapsulation when the PW extended entry having the PW extended index is determined as valid.

13. The storage medium according to claim 12, wherein by executing the machine readable instructions, the processor is further caused to:
set the validation flag in the PW extended entry as invalid when an event occurs and causes content changing of the PW extended entry; and
set the validation flag in the PW extended entry as valid after the PW extended entry is updated according to the event.

14. The storage medium according to claim 11, wherein, the network device includes a layer-2 virtual entity (L2VE) interface corresponding to the L2VPN, and the PW extended entry in the PW extended table further includes a counting address field for the L2VE interface, and by executing the machine readable instructions, the processor is further caused to:
count packets received from the L2VE interface by using the counting address field for the L2VE interface in the PW extended entry having the PW extended index.

15. The storage medium according to claim 11, wherein, the network device includes a layer-2 virtual entity (L2VE) interface corresponding to the L2VPN, and by executing the machine readable instructions, the processor is further caused to:
generate the PW extended table according to a L2VE interface table, a L2VPN public network tunnel table and the adjacency table.

\* \* \* \* \*